US012666140B2

(12) United States Patent
Su et al.

(10) Patent No.: US 12,666,140 B2
(45) Date of Patent: Jun. 23, 2026

(54) CONTRIBUTION-BASED CLOSE-UP CONTROL

(71) Applicant: International Business Machines Corporation, Armonk, NY (US)

(72) Inventors: Jun Su, Beijing (CN); Su Liu, Austin, TX (US); Guang Han Sui, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/589,708

(22) Filed: Feb. 28, 2024

(65) Prior Publication Data

US 2025/0274651 A1 Aug. 28, 2025

(51) Int. Cl.
| | |
|---|---|
| *H04N 23/60* | (2023.01) |
| *G10L 15/18* | (2013.01) |
| *G10L 25/57* | (2013.01) |
| *H04L 12/18* | (2006.01) |
| *H04N 23/69* | (2023.01) |

(52) U.S. Cl.
CPC ............. *H04N 23/64* (2023.01); *G10L 15/18* (2013.01); *G10L 25/57* (2013.01); *H04L 12/1831* (2013.01); *H04N 23/69* (2023.01)

(58) Field of Classification Search
CPC ........ H04N 23/64; H04N 23/69; G10L 15/18; G10L 25/57; H04L 12/1831
USPC ......... 348/14.12, 14.03, 14.02, 14.08, 14.09, 348/14.1, 14.77, 14.78
See application file for complete search history.

(56) References Cited

U.S. PATENT DOCUMENTS

| | | | |
|---|---|---|---|
| 9,426,421 | B2 | 8/2016 | Balasaygun et al. |
| 11,367,306 | B1 | 6/2022 | Kuo et al. |
| 11,563,916 | B2 | 1/2023 | Pell |
| 11,665,284 | B2 | 5/2023 | Jorasch et al. |
| 11,736,660 | B2 | 8/2023 | Smith et al. |
| 11,770,422 | B2 | 9/2023 | Le Nguyen et al. |
| 2016/0117624 | A1 | 4/2016 | Flores et al. |

(Continued)

FOREIGN PATENT DOCUMENTS

| | | |
|---|---|---|
| CN | 111556277 B | 7/2022 |
| CN | 112292866 B | 11/2022 |

OTHER PUBLICATIONS

Disclosed Anonymously, "Method and system for tracking the focus area of a presenter and displaying the same during video conference. ", an IP.com Prior Art Database Technical Disclosure, IP.com No. IPCOM000252958D, Feb. 23, 2018, 3 pages.

*Primary Examiner* — Duc Nguyen
*Assistant Examiner* — Carissa A Jones
(74) *Attorney, Agent, or Firm* — Scully, Scott, Murphy & Presser, P.C.; James Olsen

(57) ABSTRACT
A processor set receives data detected from sensor devices associated with an online conference session. The processor set, based on analyzing the data, determines a contribution score for each of a plurality of participants attending the online conference, which is being conducted via the video stream. The contribution score indicates a participant's level of contribution during the online conference session. The processor set controls performing of an automatic close-up of a camera view in the online conference session to a participant having a highest contribution score among the plurality of participants attending the online conference being conducted via the video stream.

20 Claims, 8 Drawing Sheets

(56) References Cited

U.S. PATENT DOCUMENTS

| | | | |
|---|---|---|---|
| 2018/0007100 A1* | 1/2018 | Krasadakis | ........ G06Q 10/1093 |
| 2024/0119731 A1* | 4/2024 | Hammer | ................ G06V 40/23 |

* cited by examiner

CONTRIBUTION-BASED CLOSE-UP CONTROL

BACKGROUND

The present application relates generally to computers and computer applications, and more particularly to online conferencing such as World Wide Web (web) online conferencing. Web conferencing software facilitates communication between individuals online via transmission of audio/video (A/V) data of the individuals in real-time over a network.

BRIEF SUMMARY

The summary of the disclosure is given to aid understanding of a computer system and method of contribution-based close-up control, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in some embodiments, includes receiving, by a processor set, data detected from sensor devices associated with an online conference session being conducted via a video stream. The computer-implemented method also includes, based on analyzing the data, determining, by the processor set, a contribution score for each of a plurality of participants attending the online conference being conducted via the video stream, the contribution score indicating a participant's level of contribution during the online conference session being conducted via the video stream. The computer-implemented method also includes controlling, by the processor set, performing of an automatic close-up of a camera view in the online conference session to a participant having a highest contribution score among the plurality of participants attending the online conference being conducted via the video stream.

A computer system and a computer program product configured to achieve or cause the method described above are also disclosed herein.

Further features as well as the structure and operation of various embodiments are described in detail below with reference to the accompanying drawings. In the drawings, like reference numbers indicate identical or functionally similar elements.

DETAILED DESCRIPTION

Figure 1:
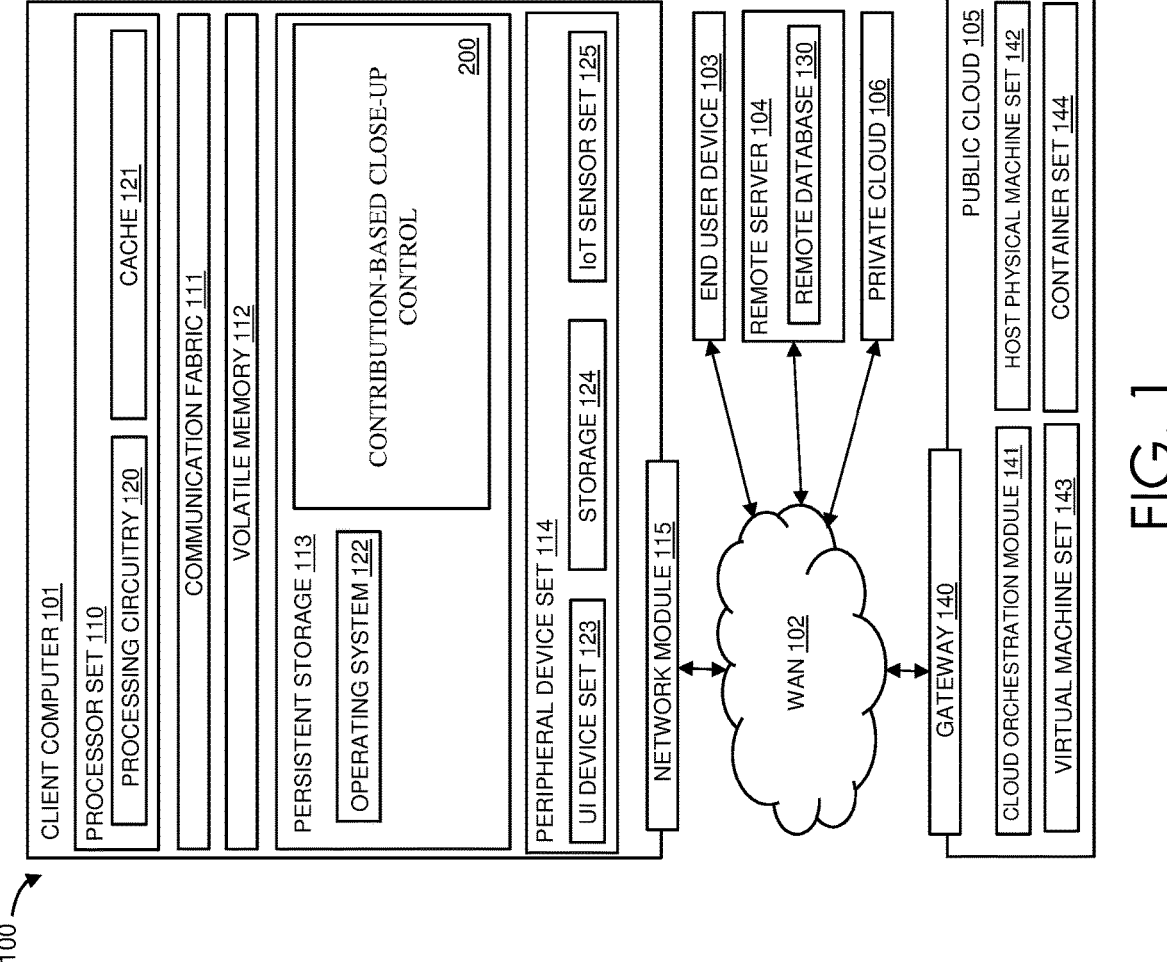
FIG. 1 shows an example of a computing environment, which can implement contribution-based close-up control in some embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as contribution-based close-up control algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Web conferencing has become a common method for communication and collaboration among people in different locations. However, one of the main challenges of web conferencing is maintaining the attention and engagement of participants. Often, participants become disengaged when they cannot identify the key contributors of the discussion. The existing close-up and focus control operations use a special camera with rotation parts and zoom lens installed in a remote conference room. Further, the traditional approach of manually adjusting the camera's close-up and focus can be time-consuming and does not always capture relevant aspects of the conversation. In some embodiments, systems and methods are disclosed for automatically adjusting camera close-up and focus to relevant content and contributors of the discussion in an online conference call. In some embodiments, the systems and methods utilize Internet of Things (IoT) sensors and data analysis. In some embodiments, the systems and methods define and enable a contribution-based close-up control bot on client-side enabled with human-computer interaction (HCl) to enhance a World Wide Web (web) or online conference session. In some embodiments, the systems and methods intelligently identify leaders or presenters in a video conference, track, close-up and focus on the identified leaders or presenters in the video conference, and allow identified leaders or presenters more camera focus and close-up in the video conference.

In some embodiments, by integrating IoT sensors and human-computer interaction analysis, the systems and methods provide an IoT-enabled technique for content- and subject-based camera close-up and focus on the client side during a conference meeting.

In some embodiments, the systems and methods involve real-time content and subject analysis using IoT sensors, determining a core subject topic being discussed, and adjusting the camera's close-up and focus to a relevant major contributor of the discussion, for providing a more engaging and productive meeting experience for online conference participants.

Any data that is gathered or monitored is performed with a permission from the participants and owners of the data. Participants of the conference and other uses are given the choice of opting in or opting out of providing any data used for processing of contribution-based close-up control bot or methodology.

Figure 2:
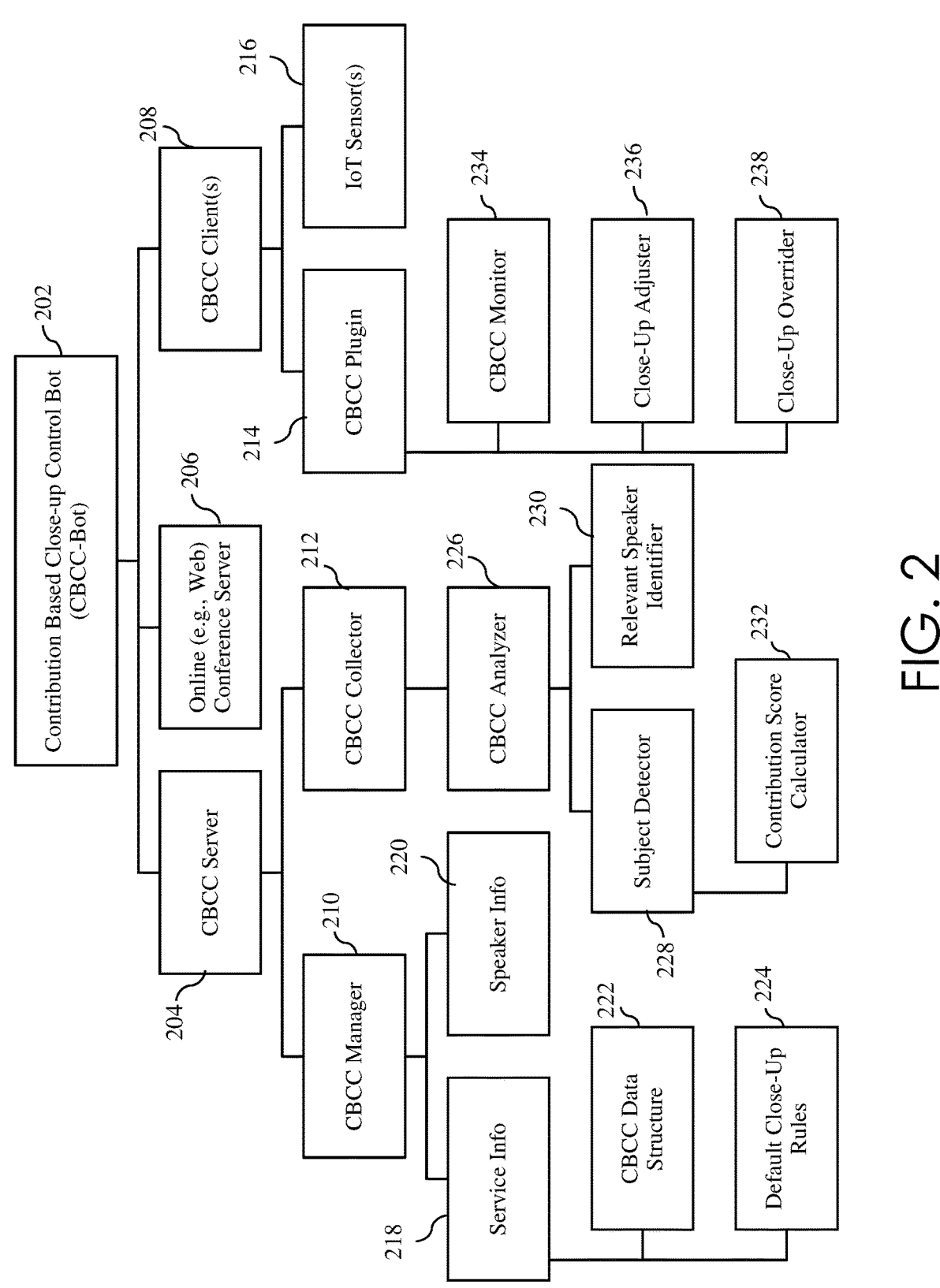
FIG. 2 is a diagram illustrating components of a system that implements contribution-based close-up control in some embodiments.

FIG. 2 is a diagram illustrating components of a system in some embodiments. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. The components enable a method of contribution-based close-up control bot on a client-side that is enabled with HCl analysis for dynamically and intelligently adjusting the close-ups of participants in video conferencing to those who are contributing substantive content in the conference meeting, thereby enhancing the online or web conference experience. For example, contribution-based close-up control bot 202 uses services of contribution-based close-up control server 204, online conference server 206 such as a web conference server, and contribution-based close-up control client 208. For instance, a frame of contribution-based close-up control bot 202 on client side for enhancing an online conference experience is defined with instantiation of contribution-based close-up control server 204 and contribution-based close-up control client 208. CBCC server 204 includes or controls CBCC manager 210 and CBCC collector 212. CBCC manager 210 manages and/or maintains service information 218 and speaker information 220. Service information 218 includes CBCC data structure 222 and default close-up rules 224. A data structure 222 is defined for tracking and saving the contribution-based close-up control (CBCC) data in real time. The data structure 222 includes data attributes and associated values (also referred to as CBCC data) such as, but not limited to, meeting identifier (MeetingID), participant identifier (ParticipantID), mapped voice identifier (MappedVoiceID), time (TimeStamp), audio data of participant speech or participant speech audio (ParticipantSpeechAudio), text of participant speech or participant speech text (ParticipantSpeechText), current subject or content of the conference (CurrentSubject), contribution score (ContributionScore), room identifier (RoomID) whose values can be remote or local (Remoted/LocalRoom), and close-up (Close-Up). Default close-up rules 224 can be provided or preconfigured, which the CBCC-Bot uses in performing close-ups during conference sessions. In some embodiments, a user or the like may provide default close-up rules 224.

CBCC client 208 includes CBCC plugin 214, which can be defined and integrated with existing web conferencing platforms on client side. Such web conferencing platforms can be accessed by a wider audience. For example, CBCC plugin 214 can be an extension or add-in to a client-side of an existing web conferencing platform. CBCC plugin 214 can be a user interface between users and conference platform server 206 for controlling subject-based or contribution-based close-up operation and incorporating both participant speech and IoT data from IoT sensors 216. IoT sensors 216 can be wearable devices or other sensor devices. By way of example, CBCC client 208 communicate with one or more IoT sensors 216 via short range wireless communication protocols such as, but not limited to, Bluetooth™. User interface functionality of CBCC plugin 214 enables each user to manually adjust and customize close-up operations. CBCC plugin 214 via the user interface functionality can allow users to configure CBCC service information 218 and define default close-up rules 224, used by CBCC manager 210, for example, in cases in which the CBCC server 204/client 208 framework is unable to accurately determine the relevant or major contributor in a conference session.

Via a network of IoT sensors 216, CBCC client 208 monitors and captures data on each participant location, movement, and audio levels in each conference rooms, and/or other information used in performing automatic close-ups. For example, CBCC monitor 234 performs monitoring and capturing of such data. Monitored and captured data is communicated or transmitted to CBCC collector 212. CBCC analyzer 226 analyzes the captured data, for example, the audio and video data captured from the web conferencing session. CBCC analyzer 226 uses techniques such as, but not limited to, integrated real-time speech recognition and natural language processing algorithms. Subject detector 228 detects core subject being discussed by participants in the remote and local conference room, and the relevance of the discussion to the meeting agenda. Contribution score calculator 232 calculates contribution score per participant, for example, according to the frequency and relevance of the participant's contributions, and also using the participant's location and movement within the room. Relevant speaker identifier 230 identifies a relevant or major speaker to the discussion according to calculated contribution score. Close-up adjuster 236 adjusts the camera's close-up and focus to the identified relevant or major contributor of the discussion on client side based on speech and IoT data. Close-up overrider 238 overrides and restores the adjusted close-ups and focuses according to user's feedback, operation (e.g., touch, click and/or point), speech topic changes, and/or another factor.

Figure 3:
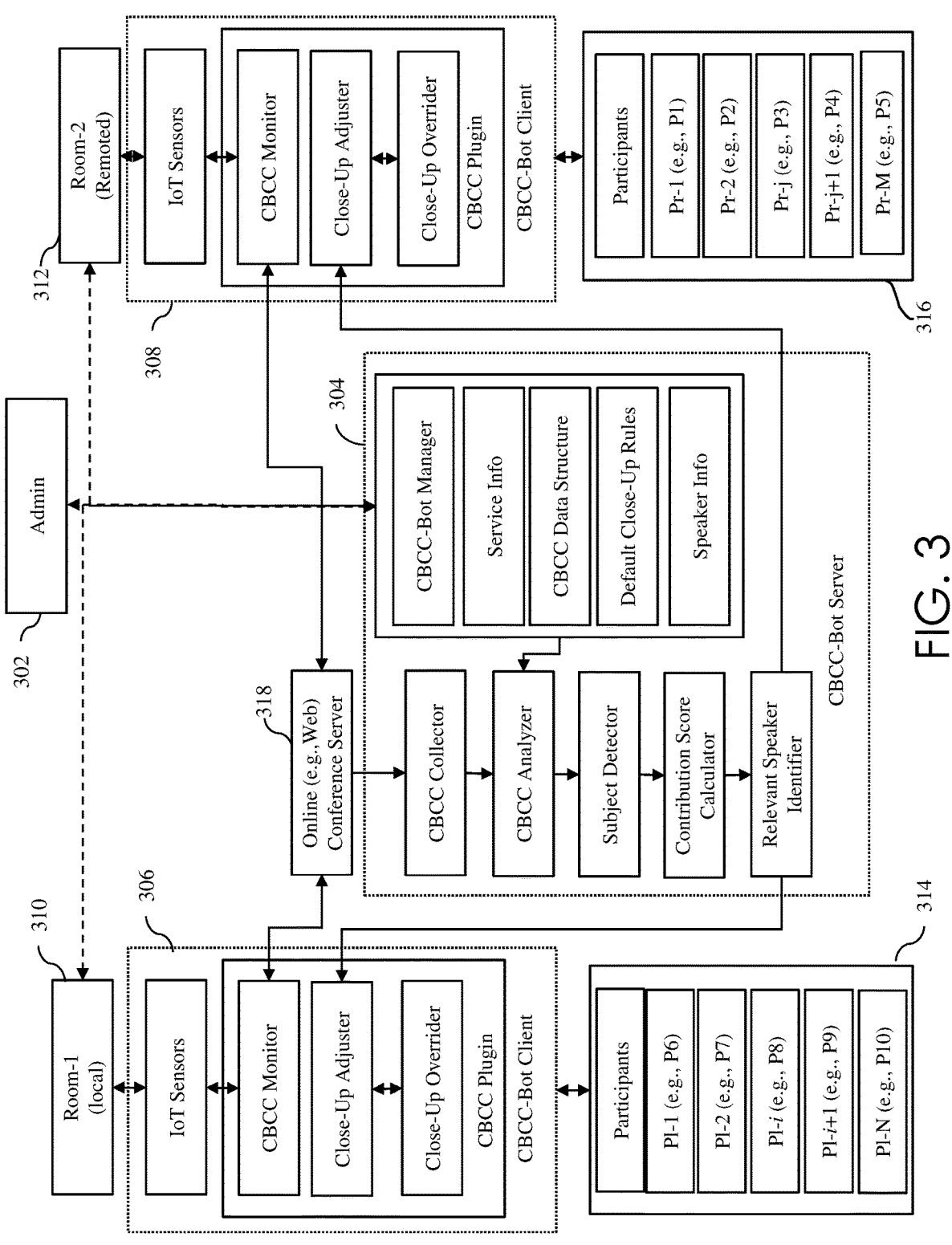
FIG. 3 is a flow diagram that illustrates a contribution-based close-up control processing in some embodiments.

FIG. 3 is a flow diagram that illustrates a contribution-based close-up control processing in some embodiments. Components shown in FIG. 3 can be implemented by or run on one or more hardware processors, for example, described with reference to FIG. 1. Administrator function 302 oversees running of server 304 and client 306, 308 components of a CBCC conference session. Administrator function 302 can be another user interface via which an administrator or a like user may interface with and manage CBCC components. Consider that an online meeting or conference is being conducted among participants 314 located in room 310 (local location) and participants 316 located in room 312 (remote location). Participants who are in a room participating in a conference session, and also have opted-in for CBCC service are considered for CBCC service described herein. Each of the rooms 310 and 312 has a computer or processor that is running CBCC client 306, 308 respectively (e.g., also described with reference to FIG. 2 at 208). For example, as described with reference to FIG. 2, CBCC client (e.g., 306, 308) includes CBCC plugin, which can be integrated with an existing conference platform such as a web conferencing platform on client side, and communicate with that web conferencing platform's server 318. CBCC plugin can function as a user interface between participants and CBCC server 304 via web conference platform server 318, for controlling subject-based or contribution-based close-up operations, for example, based on monitored and/or captured data, which can include data captured from one or more IoT sensors.

Using a network of IoT sensors and/or computer's camera, microphone and/or speaker, CBCC client 306, 308 monitors and captures data on each participant location, movement, and audio levels in each conference rooms, and/or other information used in performing automatic close-ups. For example, CBCC monitor performs monitoring and capturing of such data. Close-up adjuster adjusts the camera's close-up and focus to the identified relevant or major contributor of the discussion on client side based on speech and IoT data. Close-up overrider overrides and restores the adjusted close-ups and focuses according to user's feedback, operation (e.g., touch, click and/or point), speech topic changes, and/or another factor.

Monitored and captured data from CBCC client 306, 308 is communicated or transmitted to CBCC collector of CBCC server 304, e.g., via a web conference server 318. CBCC analyzer of CBCC server 304 analyzes the captured data, for example, the audio and video data captured from the web conferencing session. CBCC analyzer uses techniques such as, but not limited to, integrated real-time speech recognition and natural language processing algorithms. Subject detector of CBCC server 304 detects core subject being discussed by participants 314, 316 in the remote 312 and local 310 conference rooms, and the relevance of the discussion to the meeting agenda. Contribution score calculator of CBCC server 304 calculates contribution score per participant, for example, according to the frequency and relevance of the participant's contributions, and also using the participant's location and movement within the room. Relevant speaker identifier of CBCC server 304 identifies a relevant or major speaker to the discussion according to calculated contribution score.

CBCC server 304 also manages and maintains data used in CBCC processing. For example, as described with reference to FIG. 2, CBCC manager of CBCC server 304 manages and/or maintains service information and speaker information. Service information includes CBCC data structure (e.g., described with reference to 222 in FIG. 2) and default close-up rules. The CBCC data structure can be updated in real time, for example, based on data captured during a conference session and/or based on analyzed data. Default close-up rules can be provided or preconfigured, which the CBCC server 304 uses in performing close-ups during conference sessions via a client 306, 308.

In some embodiments, an admin functionality 302 communicates with CBCC manager of CBCC server 304, and for example, update the service information such as CBCC data structure, close-up rules, and speaker information. In some embodiments, CBCC plugin via a user interface functionality can allow users to configure CBCC service information, define default close-up rules, and other data used by CBCC server 304.

In some embodiments, based on contribution scores and close-up rules, CBCC client 306 in room 310 dynamically performs a close-up during a video conference to one or more participants 316 in room 312. Similarly, based on contribution scores and close-up rules, CBCC client 308 in room 312 dynamically performs a close-up during a video conference to one or more participants 314 in room 310. By way of example, there are N number of participants 314 in room 310, and M number of participants 316 in room 312, where N and M are integer values.

In some embodiments, contribution score calculator of CBCC server 304 (also shown at 232 in FIG. 2) determines contribution score by analyzing conference topics, identifying key speakers and/or major contributors, to understand the dynamics of the discussion. In some embodiments, contribution score calculator of CBCC server 304 may use one or more of the following variable and factors. The variable and factors, in some embodiments, can be configured or selected by one or more users such as one or more meeting participants.

For example, in some embodiments, transcriptions can be used. Recorded conversation of the meeting can be transcribed to text, and the text analyzed. For example, a participant's contribution can be quantified using the text that analyzed. Other speech analysis method or technique can be used to calculate contribution scores of participants.

As another example, word count and speaking time can be used to determine contribution score of a participant. For example, transcripts can be analyzed to determine the word count and speaking time for each participant. Those who contribute significantly more words or speaking time may be considered key speakers or major contributors (e.g., relevant contributors).

As another example, frequency of contributions can be used to determine contribution score of a participant. For instance, how often each participant contributes to the discussion can be determined. Frequent contributions may indicate active engagement and leadership in the conversation.

As another example, relevance of contributions can be used to determine contribution score of a participant. For instance, the relevance of each participant's contributions to the discussion can be assessed by evaluating whether the participant's remarks are central to the conversation and/or provide insights that are pertinent to the main topic of discussion.

As another example, quality of contributions can be used to determine contribution score of a participant. The quality and depth of contributions can be considered, for example, whether the speaker's speech is providing insights, sharing expertise, and/or asking questions that drive the discussion forward.

As another example, acknowledgment by others can be used to determine contribution score of a participant. For instance, how other participants react to each person's contribution can be determined. For example, if other participants frequently acknowledge or respond positively to a participant, it may indicate their influence in the conversation.

As another example, role in facilitating discussion can be used to determine contribution score of a participant. For instance, participants are identified who take on roles such as facilitating the discussion, summarizing key points, or directing the conversation. These individuals can be considered being key speakers or leaders in the group.

As another example, use of non-verbal cues can be used to determine contribution score of a participant. For example, non-verbal cues such as body language and tone of voice can be considered or identified. Confidence and assertiveness in communication can be indicators of a key speaker.

As another example, consistency across topics can be used to determine contribution score of a participant. Assessment can be made as to whether certain participants consistently take on leadership roles or contribute significantly across different topics. Consistent involvement may indicate their overall importance as a contributor in the group.

As another example, review group dynamics can be used to determine contribution score of a participant. For example, the overall dynamics of a group or participants can be considered. For instance, it is determined as to whether certain participants consistently are leading discussions, or whether speaking roles shift depending on a topic. Understanding group dynamics provides context for identifying key speakers (e.g., relevant speakers relevant to the conference).

The following describes a use case example scenario of online conference or meeting (e.g., video meeting) during which an artificial intelligence (AI) is being discussed and demonstrated among participants P1, P2, P3, P4, and P5. Participants' contribution scores are computed based on one or more variable and/or factors described above.

Example Scenario: AI demonstration conference Meeting. The participants are gathered to discuss the latest advancements and applications of AI technology in various industries. Moderator: Welcome, everyone, to the AI Demo Conference. Today, we have an esteemed group of participants, each bringing unique perspectives to the table. Let's kick off the discussion with a brief overview of recent AI developments. P1, would you like to share some insights?

P1 (Contribution Score: 143.25): Certainly. Over the past few months, we've witnessed a surge in natural language processing applications. This includes improved sentiment analysis and language understanding, making AI-driven chatbots more effective in customer service. Moderator: Thank you, P1. That's an interesting development. P2, any thoughts to add?

P2 (Contribution Score: 142.75): Building on P1's point, I've been involved in a project leveraging AI for image recognition. The accuracy and speed of image classification algorithms have seen significant improvements, especially in healthcare applications for diagnostics. Moderator: Excellent, P2. Now, let's shift our focus to AI in finance. P3, you've been actively involved in this area. Please share your thoughts.

P3 (Contribution Score: 213.5): Absolutely. In the financial sector, AI is revolutionizing fraud detection. Advanced machine learning models, coupled with anomaly detection techniques, have proven to be highly effective in identifying suspicious activities and preventing fraudulent transactions.

Moderator: Fascinating insights, P3. Let's hear from P4. Any observations on how AI is impacting education?

P4 (Contribution Score: 76.25): In the education sector, we are exploring AI-driven personalized learning platforms. However, there are challenges related to data privacy and ensuring fair access to educational resources.

Moderator: Thank you, P4. Finally, P5, your thoughts on the future trends in AI?

P5 (Contribution Score: 115.5): Looking ahead, I see a growing integration of AI with augmented reality (AR) and virtual reality (VR). This combination has the potential to transform various industries, from gaming to remote collaboration.

Moderator: Fantastic insights from all participants. It's evident that each of you brings valuable perspectives to the table. Let's open the floor for questions and further discussion.

In the above example, the contributions of each participant align with their calculated contribution scores. P3, with the highest contribution score, played a significant role in providing insights into AI applications in finance, while others shared their expertise in different domains. This scenario illustrates how participants with higher contribution scores may take on leadership roles in specific discussion topics. Calculated scores can be used to effect a close-up or focus on a participant during a meeting.

The following illustrates an implementation example of close-up operation. Consider the participants (P1, P2, P3, P4, P5) 316 in a conference meeting room (e.g., Room-2 (remoted) 312 in FIG. 3). The participants' contribution scores are calculated based on one or more pre-selected factors. By way of example, the participants' contribution scores are calculated based on pre-selected four factors by users: word count, frequency of contributions, relevance of contributions, and acknowledgment by others. Example calculations as follows: Word count counts the number of words each participant contributes to the discussion—e.g., P1—250 words, P2—180 words, P3—320 words, P4—150 words, P5—200 words; Frequency of contribution counts the number of times each participant actively contributes to the discussion—e.g., P1—8 times, P2—5 times, P3—10 times, P4—4 times, P5—6 times; Relevance of contribution assess the relevance of each participant's remarks to the main topic and assigns a relevance score (e.g., 1 for less relevant, 2 for moderately relevant, 3 for highly relevant)—e.g., P1-2, P2-3, P3-3, P4-1, P5-2; acknowledgment by others counts how many times other participants acknowledge or respond positively to each participant—e.g., P1-5, P2-7, P3-8, P4-3, P5-6. Other factors can be used.

In some embodiments, relevance-based contribution score can be computed based on analyzing text translations of participants speech, matching terms and phrases in the text translations to the current subject or topic, and summing the number of such matches for each participant. In the example scenario, P1's speech includes terms "sentiment analysis" and "AI-drives", which are considered matches to current subject of "AI"; P2's speech includes use of the term "AI" once, which is considered a match to current subject; P3's speech includes use of the terms "financial sector, AI" and "machine learning models", which are considered a match to current subject.

By way of example, in some embodiments, the contribution score is calculated for each participant by combining the values of the pre-selected factors. In some embodiments, weights are assigned to each factor based on their importance to the analysis. For example:

> Contribution Score=(Word Count×WeightWord Count)+(Frequency×WeightFrequency)+(Relevance×WeightRelevance)+(Acknowledgments× WeightAcknowledgments).

As an example, equal weights can be assigned to each factor, e.g.:

> Contribution Score=(0.25×Word Count)+(0.25×Frequency)+(0.25×Relevance)+(0.25×Acknowledgments).

As an example, the above formula can be used to calculate contribution score of a participant, e.g., for each participant 402 see close-ups of participants in room 404 based on analysis (e.g., contribution scores) of participants' speech in room 404. For example, an online conference platform's client-side software running on a computer or like in room 402 (or running on a computer or like associated with room 402) displays views of participants in room 404, and performs automatic close-up based on participant contribution during a conference session as described herein. Via the online conference platform's client-side software, participants in room 402 can also manually control or override automatic close-up. Similarly, although not shown in FIG. 4, participants in room 404 can see close-ups of participants in room 402 based on analysis (e.g., contribution scores) of participants' speech in room 402, via an online conference platform's client-side software running on a computer or like in room 404 (or running on a computer or like associated with room 404).

Figure 5:
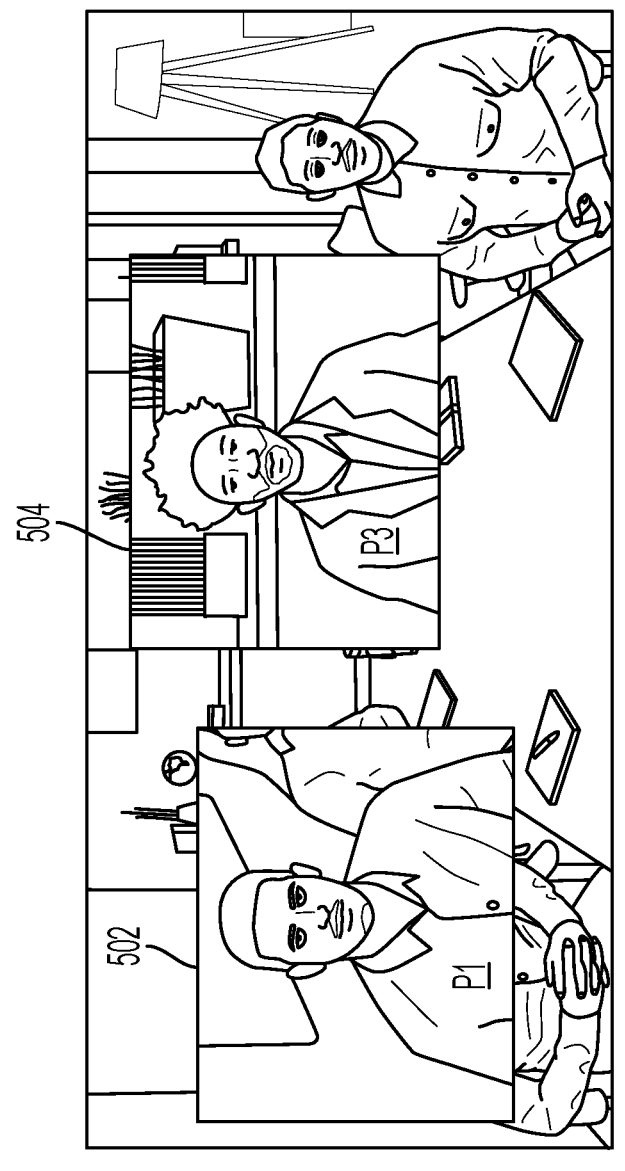
FIG. 5 is a diagram showing close-up examples rendered during a conference session in some embodiments.

FIG. 5 is a diagram showing close-up examples rendered during a conference session in some embodiments. Based on the contribution scores for each participant using the above example (e.g., using equal weights for simplicity), participant shown at 504 who may represent P3 in the above example, has the highest contribution score, making that participant 504 the most significant contributor based on the chosen factors and weights. Adjusting the weights for each factor can influence the overall ranking, allowing a user to prioritize the factors that are most relevant to current analysis. Table 1 shows example calculated contribution scores of participants.

TABLE 1

| Participant | Word Count | Frequency | Relevance Score | Acknowledgment | Contribution Score |
|---|---|---|---|---|---|
| P1 | 250 | 8 | 2 | 5 | 143.25 |
| P2 | 180 | 5 | 3 | 7 | 142.75 |
| P3 | 320 | 10 | 3 | 8 | 213.5 |
| P4 | 150 | 4 | 1 | 3 | 76.25 |
| P5 | 200 | 6 | 2 | 6 | 115.5 | of the conference. The participant with the highest contribution can be considered a more significant contributor to the conference discussion. In some embodiments, weights can be adjusted as needed based on the importance of each factor in the analysis.

Calculation of contribution scores for participants is a real-time processing that is done in real-time as the participant take turns in speaking. For example, as a discussion continues, contribution scores get updated. Updated contribution scores trigger updates to close-ups being rendered on a video.

Figure 4:
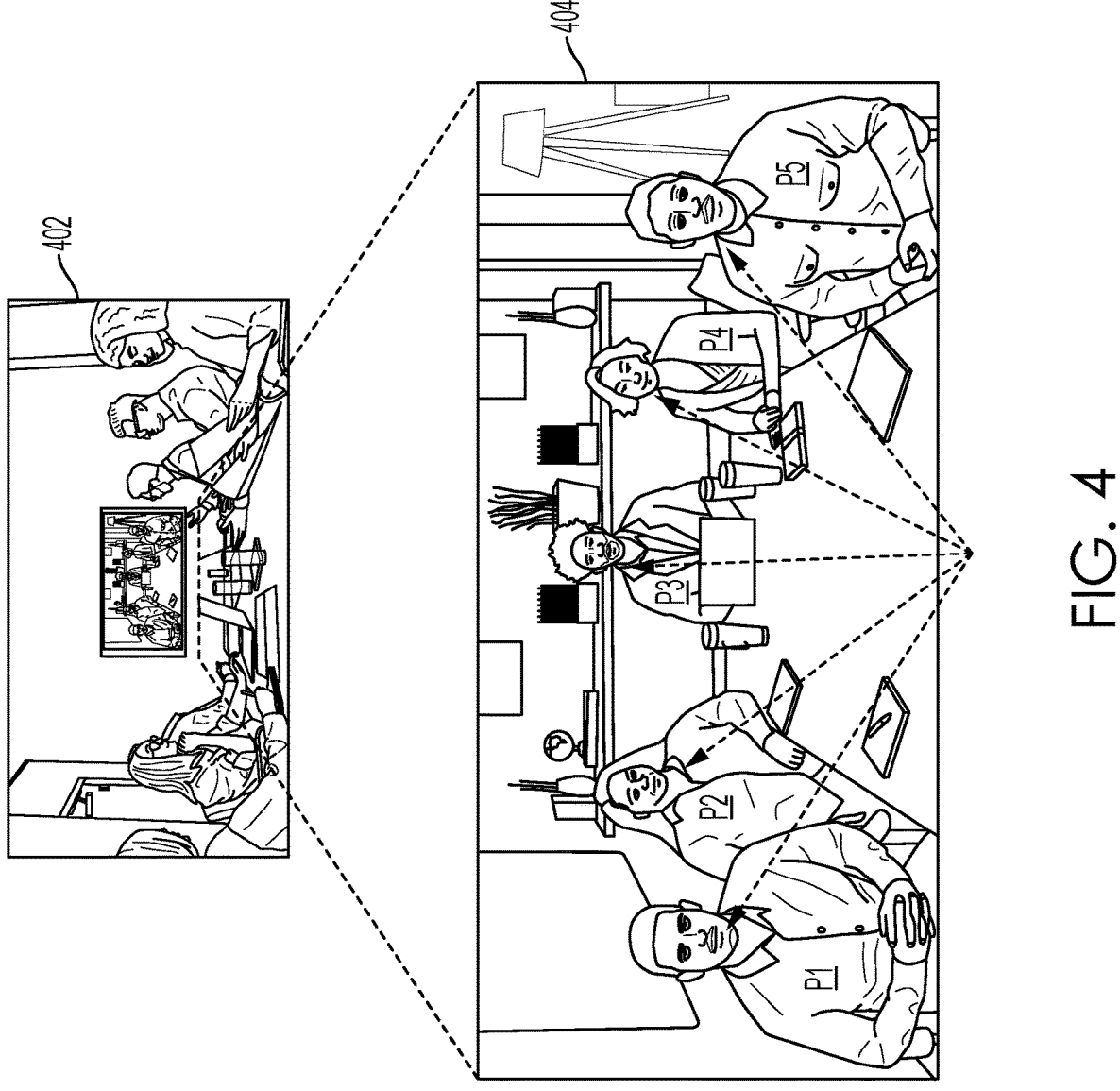
FIG. 4 is a diagram showing example conference session in some embodiments.

FIG. 4 is a diagram showing example conference session in some embodiments. Conference session is held between participants in room 402 and room 404. Participants in room Consider by way of example that close-up rules includes: "Only close-up top two contributors with the highest contribution scores on the conference screen in 30 seconds, and the sizes of close-ups are associated with the calculated contribution scores." Based on the above contribution scores and close-up rules, P1 shown as 502 and P3 shown as 504 have close-up camera views on the conference screen.

Figure 6:
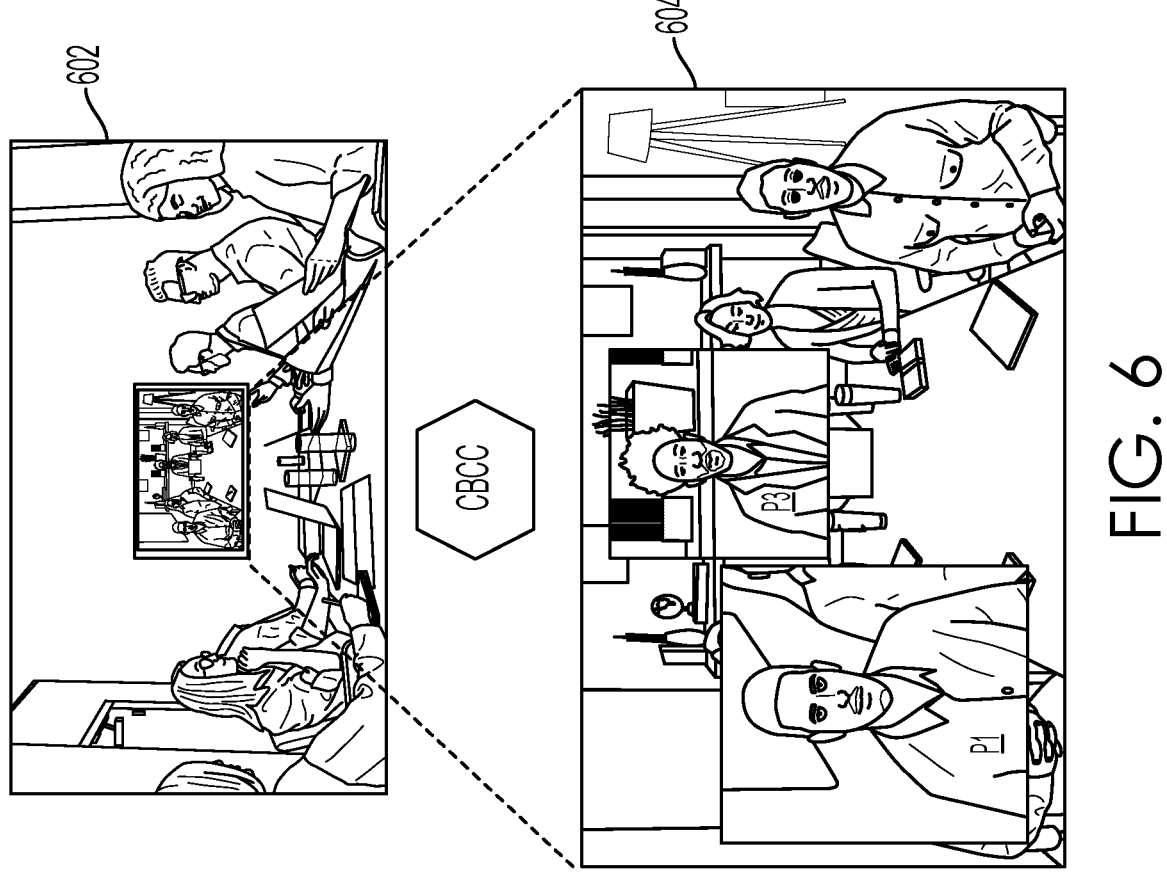
FIG. 6 shows an example conference session where participants appear close-up in some embodiments.

FIG. 6 shows an example conference session where participants appear close-up in some embodiments. From room 602, participants in room 604 appear close-up, based on CBCC analysis.

Table 2 shows an example of data structure, e.g., CBCC data structure shown in FIG. 2 at 222 and also as part of CBCC server in FIG. 3 at 304.

TABLE 2

| Meeting ID | Participant ID | Mapped Voice ID | Time Stamp | Participant Speech Audio | Participant Speech Text | Current Subject | Contribution Score | Room ID (remote/ local) | Close-Up |
|---|---|---|---|---|---|---|---|---|---|
| | P1 | P1 | 10:02 | "xxxxxx" | "xxxxxx" | AI | 143.25 | Room 2 | Yes |
| | P2 | P2 | 10:03 | "xxxxxx" | "xxxxxx" | AI | 142.75 | Room 2 | No |
| | P3 | P3 | 10:04 | "xxxxxx" | "xxxxxx" | AI | 213.5 | Room 2 | Yes |

TABLE 2-continued

| Meeting ID | Participant ID | Mapped Voice ID | Time Stamp | Participant Speech Audio | Participant Speech Text | Current Subject | Contribution Score | Room ID (remote/ local) | Close-Up |
|---|---|---|---|---|---|---|---|---|---|
| | P4 | P4 | 10:05 | "xxxxxx" | "xxxxxx" | AI | 76.25 | Room 2 | No |
| | P5 | P5 | 10:06 | "xxxxxx" | "xxxxxx" | AI | 115.5 | Room 2 | No |

Contribution-based close-up control bot or method can improve online conference tools and provide enhanced web conference experience. For instance, contribution-based close-up control bot running on a client side enabled with HCl analysis can dynamically and intelligently close-up on contributors in a conference meeting and enhance web conference.

In some embodiments, the systems and methods disclosed herein provide for objective assessment. For example, the systems and methods provide a structured and objective way to assess participants' contributions, minimizing subjective biases. By assigning numerical values to factors like word count, frequency, relevance, and acknowledgment, the systems and methods create a more objective evaluation framework.

In some embodiments, the systems and methods disclosed herein provide for data-driven insights. For instance, the approach of the systems and methods allows for data-driven insights into participants' engagement levels and contributions. This can be particularly useful for large conferences or meetings where it can be challenging to manually track each participant's involvement.

In some embodiments, the systems and methods disclosed herein provide for identification of key speakers. By analyzing contribution scores, it becomes easier to identify key speakers or participants who play leadership roles in the discussion. This information can be valuable for organizers, helping them recognize and acknowledge influential contributors.

In some embodiments, the systems and methods disclosed herein provide for focused recognition. Recognition is given based on quantifiable factors, such as word count and relevance, rather than subjective judgments. This ensures that participants are acknowledged for their substantive contributions to the discussion.

In some embodiments, the systems and methods disclosed herein provide for effective moderation. Moderators can use contribution scores to guide the flow of the discussion. For example, moderators can identify participants who may have valuable insights to share and ensure a balanced representation of perspectives.

In some embodiments, the systems and methods disclosed herein provide for improvement in feedback mechanism. Participants can receive feedback based on their contribution scores, highlighting areas where they excel or suggesting areas for improvement. This feedback can be valuable for professional development.

In some embodiments, the systems and methods disclosed herein provide for adaptability to different criteria. The systems and methods can be adaptable to different criteria or weights assigned to factors based on the goals of the assessment. This flexibility allows organizers to tailor the evaluation to suit the specific dynamics of the conference.

In some embodiments, the systems and methods disclosed herein provide for enhanced participation monitoring. Conference organizers can use the systems and methods to monitor participants' engagement levels over time, providing insights into patterns of involvement and identifying trends in contributions.

In some embodiments, the systems and methods disclosed herein provide for fair and transparent evaluation. The systems and methods can promote fairness and transparency in evaluating contribution levels of participants. For all participants, contribution level can be assessed using the same criteria, and the results are based on objective quantifiable metrics.

In some embodiments, the systems and methods disclosed herein provide for quantifiable metrics for research. In academic or research-based conferences, the systems and methods can provide for quantifiable metrics for analyzing the participation and contributions of attendees. This can be useful for researchers studying communication dynamics in various settings.

In some embodiments, the systems and methods disclosed herein provide for time-efficient analysis. Using the systems and/or methods, with the help of automated tools for transcription and analysis, can save time in evaluating large amounts of discussion data. The systems and methods can streamline the process of understanding who the key contributors are.

Cloud functions (serverless computing) can be used to deploy and run automated scripts or algorithms for processing conference data and calculating contribution scores. Speech to Text service can be employed for transcribing spoken words during a conference. This can serve as the basis for the analysis of word count, frequency of contributions, and other factors.

In some embodiments, natural language understanding tools or services can be used to analyze the relevance of contributions by extracting entities, concepts, and sentiment from the text. Such tools or services can assist in determining the significance and topical alignment of participants' remarks.

In some embodiments, tools such as automated language translator can be used in a multilingual conference setting. Such language translator services can be used to translate contributions into a common language for consistent analysis, ensuring that the scores are based on the same criteria.

In some embodiments, implementation of contribution score calculations can be simplified using automated process tools, which can build and deploy machine learning models. In some embodiments, chatbots can be implemented that facilitate interactions, gather participant input, and provide insights into participant engagement.

Figure 7:
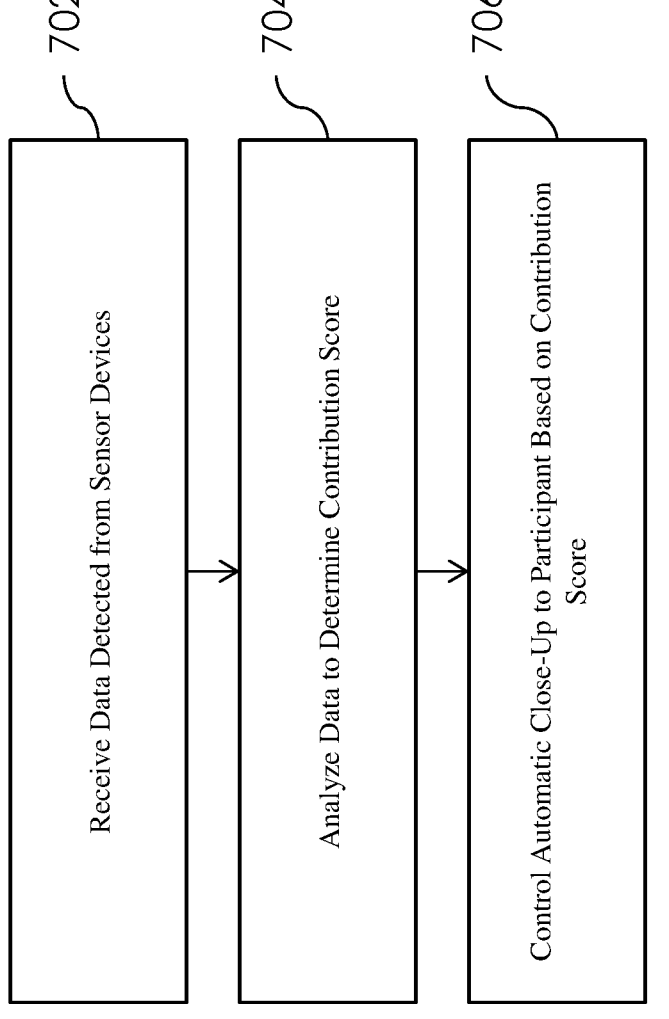
FIG. 7 is a diagram illustrating a computer-implemented method of contribution-based close-up control in some embodiments.

FIG. 7 is a diagram illustrating a computer-implemented method for contribution-based close up control in some embodiments. The method can be performed by a processor set, for example, described with reference to FIG. 1. At 702, a processor set receives data detected from sensor devices associated with an online conference session being conducted via a video stream. The data includes audio data and video data, for example, captured by devices such as a camera, microphone, and/or other devices such as IoT devices coupled with the processor set. The data includes real-time data.

At 704, the processor set, based on analyzing the data, determines a contribution score for each of a plurality of participants attending the online conference being conducted via a video stream. The contribution score indicates a participant's level of contribution during the online conference session. In some embodiments, the data is analyzed using speech recognition and natural language processing. In some embodiment, the contribution score is determined based on at least one preconfigured factor. As described above, examples of preconfigured factors include, but are not limited to, word count, frequency of speech, relevance of speech to a topic of discussion. For example, in some embodiments, wherein the contribution score is determined based on a number of spoken words. In some embodiments, the contribution score is determined based on a frequency of speech related to a topic of discussion. In some embodiments, the contribution score is determined based on a frequency of speech.

At 706, the processor set controls performing of an automatic close-up of a camera view in the online conference session, for example, a focus or close-up to a participant having the highest contribution score among the plurality of participants attending the online conference being conducted via the video stream. For instance, a camera view (e.g., display or screen view of participants) on a device used for online conferencing can be automatically adjusted to focus on that participant having the highest contribution score. In some embodiments, the close-up of the camera view is automatically adjusted to another participant based on real-time determination of the contribution score. In some embodiments, the close-up of the camera view is adjusted based on receiving input feedback. In some embodiments, performing a close-up can include zooming-in on a participant in an online conference room view. In some embodiments, performing a close-up can include highlighting a window or area where a participant is shown in the online conference room view. In some embodiments, performing a close-up can include highlighting a participant's user identification shown in the online conference room view. Other graphical effects can be implemented that identifies, highlights, and/or otherwise focuses on a participant with based on the participant's level of contribution. In some embodiments, a data structure with attributes that stores the data and associated analytics in real-time is defined for maintaining and managing contribution scores of participants in the online conference session. In some embodiments, the method is implemented as a plugin to an online conference platform.

In some embodiments, the method enables contribution-based close-up control bot on client-side, which is enabled with HCl analysis, for dynamically and intelligently performing close-up views on contributors during the online conference session. Via an IoT network, data can be captured on participant location, movement and audio levels in online conference rooms during the online conference session. In some embodiments, audio and video data captured from the online conferencing session can be analyzed by using integrated real-time speech recognition modules and NLP algorithms. In some embodiments, core subject being discussed by participants in remote and local conference rooms can be detected, e.g., using integrated real-time speech recognition modules and NLP algorithms, and the relevance of the discussion to the meeting agenda can be detected, for example, as described above. Contribution score can be calculated, for example, according one or more preselected factors, for example, according to the amount, frequency and/or relevance of participants' contributions. Participants' location and/or movement within a room can also be used in calculating the contribution score. Major or relevant contributors to the discussion can be identified according to calculated contribution scores. The camera's view can be adjusted to focus on the identified major or relevant contributor to the discussion, on client side of an online conference platform, for example, based on speech and other IoT data.

In some embodiment, the adjusted close-ups and focuses can be overridden or restored according to users' feedback, operation (touch/click/point), change of speech topic changes, and/or other conditions or factors. In some embodiments, users can be given an option to configure service and define default rules for performing close-up.

In some embodiments, a client-side framework is defined for contribution-based close-up control bot, e.g., on client side of a client-server online platform. A data structure can be defined, tracked and saved/stored in real time, for example, in a database, for example, on server side of the client-server online platform. A plugin can be defined, which can be integrated with an existing online or web conferencing platforms on client side. The plugin can be a user interface between users and conference platform server for controlling contribution-based close-up operations and incorporating both speech and IoT data. The user interface provides an option to a user to manually adjust and customize close-up operations.

Figure 8:
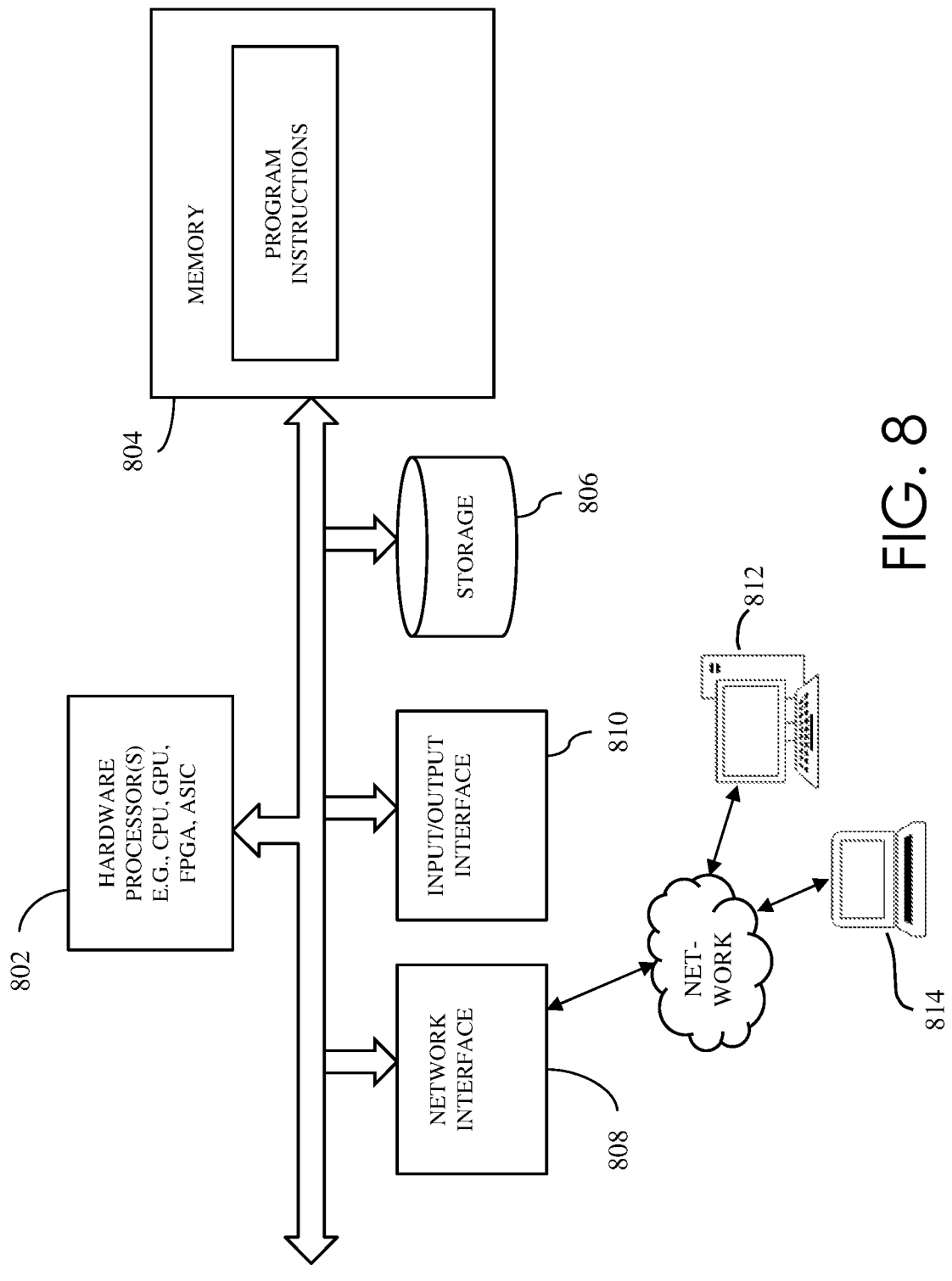
FIG. 8 is a diagram showing components of a system that facilitates contribution-based close-up control processing in some embodiments.

FIG. 8 is a diagram showing components of a system that facilitates contribution-based close-up control processing in some embodiments, for example, as described above. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, and facilitate contribution-based close-up control in an online conference session. One or more hardware processors 802 may be a processor set, for example, described above with reference to FIG. 1. A memory device 804 may include random access memory (RAM), read-only memory (ROM) or another memory device, and may store data and/or processor instructions for implementing various functionalities associated with the methods and/or systems described herein. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive data detected from sensor devices associated with an online conference session. For example, the sensor devices may be located at conference locations having devices 812, 814 that can enable an online conference meeting among participants at those locations, and may capture data associated with the participants. Based on analyzing the data, one or more hardware processors 802 may determine a contribution score for each of a plurality of participants attending the online conference, for example, in a conference room. The contribution score indicates a participant's level of contribution during the online conference session. One or more hardware processors 802 may control performing of an automatic close-up of a camera view in the online conference session to a participant having a highest contribution score. For example, one or more hardware processors 802 may communicate with a user interface running on a user device (e.g., 812, 814) in a physical room or location, and control the user interface to perform an automatic close-up of a camera view in the online conference session to a participant having a highest contribution score. Data used by one or more processors 802 may be stored in a storage device 806 or received via a network interface 808 from a remote device, and may be temporarily loaded into a memory device 804 for facilitating contribution-based close-up control processing described herein. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

receiving, by a processor set, data detected from sensor devices associated with an online conference session being conducted via a video stream;

based on analyzing the data, determining, by the processor set, a contribution score for each of a plurality of participants attending the online conference session being conducted via the video stream, the contribution score indicating a participant's level of contribution during the online conference session being conducted via the video stream, the contribution score of a participant determined based on at least the participant summarizing points of the online conference session during the online conference session, overall tone of the participant during the online conference session and participant's consistency across different topics during the online conference session; and controlling, by the processor set, performing of an automatic close-up of a camera view in the online conference session to a participant having a highest contribution score among the plurality of participants attending the online conference being conducted via the video stream.

2. The computer-implemented method of claim 1, wherein the data includes real-time data.

3. The computer-implemented method of claim 1, wherein the close-up of the camera view is automatically adjusted to another participant based on real-time determination of the contribution score.

4. The computer-implemented method of claim 1, wherein the close-up of the camera view is adjusted based on receiving input feedback.

5. The computer-implemented method of claim 1, wherein the data includes audio data and video data.

6. The computer-implemented method of claim 1, wherein the data is analyzed using speech recognition and natural language processing.

7. The computer-implemented method of claim 1, wherein the contribution score is determined based on at least one preconfigured factor.

8. The computer-implemented method of claim 1, wherein the contribution score is determined based on at least one preconfigured rule.

9. The computer-implemented method of claim 1, wherein the contribution score is determined based on a frequency of speech related to a topic of discussion.

10. The computer-implemented method of claim 1, wherein the contribution score is determined based on a frequency of speech.

11. The computer-implemented method of claim 1, wherein the contribution score is determined based on a number of spoken words.

12. The computer-implemented method of claim 1, defining a data structure with attributes that stores the data and associated analytics in real-time.

13. The computer-implemented method of claim 1, wherein the method is implemented as a plugin to an online conference platform.

14. A computer program product comprising:

a set of one or more computer-readable storage media;

program instructions, collectively stored in the set of one or more storage media, for causing a processor set to perform the following computer operations:

receive data detected from sensor devices associated with an online conference session being conducted via a video stream;

based on analyzing the data, determine a contribution score for each of a plurality of participants attending the online conference session being conducted via the video stream, the contribution score indicating a participant's level of contribution during the online conference session being conducted via the video stream, the contribution score of a participant determined based on at least the participant summarizing points of the online conference session during the online conference session, overall tone of the participant during the online conference session and participant's consistency across different topics during the online conference session; and control performing of an automatic close-up of a camera view in the online conference session to a participant having a highest contribution score among the plurality of participants attending the online conference being conducted via the video stream.

15. The computer program product of claim 14, wherein the data includes real-time data.

16. The computer program product of claim 14, wherein the close-up of the camera view is automatically adjusted to another participant based on real-time determination of the contribution score.

17. The computer program product of claim 14, wherein the close-up of the camera view is adjusted based on receiving input feedback.

18. The computer program product of claim 14, wherein the data includes audio data and video data.

19. The computer program product of claim 14, wherein the contribution score is determined based on at least one preconfigured factor.

20. A computer system comprising:

a processor set;

a set of one or more computer-readable storage media;

program instructions, collectively stored in the set of one or more computer-readable storage media, for causing the processor set to perform the following computer operations:

receive data detected from sensor devices associated with an online conference session being conducted via the video stream;

based on analyzing the data, determine a contribution score for each of a plurality of participants attending the online conference session being conducted via the video stream, the contribution score indicating a participant's level of contribution during the online conference session being conducted via the video stream, the contribution score of a participant determined based on at least the participant summarizing points of the online conference session during the online conference session, overall tone of the participant during the online conference session and participant's consistency across different topics during the online conference session; and control performing of an automatic close-up of a camera view in the online conference session to a participant having a highest contribution score among the plurality of participants attending the online conference being conducted via the video stream.

\* \* \* \* \*